United States Patent
Zhao et al.

(10) Patent No.: US 10,439,741 B2
(45) Date of Patent: Oct. 8, 2019

(54) METHOD, DEVICE AND USER TERMINAL FOR MEASURING WITH DISCOVERY SIGNAL

(71) Applicant: ZTE CORPORATION, Shenzhen, Guangdong Province (CN)

(72) Inventors: Yajun Zhao, Shenzhen (CN); Linmei Mo, Shenzhen (CN); Hanqing Xu, Shenzhen (CN)

(73) Assignee: ZTE CORPORATION (CN)

( * ) Notice: Subject to any disclaimer, the term of this patent is extended or adjusted under 35 U.S.C. 154(b) by 59 days.

(21) Appl. No.: 15/312,187

(22) PCT Filed: Aug. 8, 2014

(86) PCT No.: PCT/CN2014/084032
§ 371 (c)(1),
(2) Date: Nov. 18, 2016

(87) PCT Pub. No.: WO2015/176397
PCT Pub. Date: Nov. 26, 2015

(65) Prior Publication Data
US 2017/0111130 A1    Apr. 20, 2017

(30) Foreign Application Priority Data
May 21, 2014 (CN) .......................... 2014 1 0214575

(51) Int. Cl.
*H04B 17/318* (2015.01)
*H04L 5/00* (2006.01)
(Continued)

(52) U.S. Cl.
CPC ......... *H04B 17/318* (2015.01); *H04L 5/0007* (2013.01); *H04W 8/005* (2013.01); *H04W 24/10* (2013.01)

(58) Field of Classification Search
CPC .... H04B 17/318; H04L 5/0007; H04W 8/005; H04W 24/10
See application file for complete search history.

(56) References Cited

U.S. PATENT DOCUMENTS

2012/0115463 A1   5/2012 Weng et al.
2013/0336149 A1*  12/2013 Ishii ...................... H04W 24/10
                                                     370/252
(Continued)

FOREIGN PATENT DOCUMENTS

CN    102256319 A    11/2011
CN    103107873 A     5/2013
(Continued)

OTHER PUBLICATIONS

FiberHome, Discussion on RSSI definition for DRS based RRM measurement, 3GPP TSG RAN WG1 Meeting#77 Seoul, Korea, May 19-23, 2014, R1-142285.
(Continued)

*Primary Examiner* — Walli Z Butt
(74) *Attorney, Agent, or Firm* — McDonald Hopkins LLC

(57) ABSTRACT

A method, apparatus and user terminal for measuring with a discovery signal are disclosed in the present document. The method includes: when measuring reference signal receiving quality (RSRQ) based on a discovery signal, performing a received signal strength indication (RSSI) measurement in a sub-frame where a discovery signal is located and/or a sub-frame without the discovery signal; and acquiring the RSRQ according to the measured RSSI. With the present document, the RSSI measurement is performed based on the sub-frame where the discovery signal is located and/or the sub-frame without the discovery signal, which can reduce the measurement deviation caused by the situation that there
(Continued)

When measuring a reference signal receiving quality RSRQ based on a discovery signal, a received signal strength indication RSSI measurement is performed in a sub-frame where the discovery signal is located and/or a sub-frame without the discovery signal — S101

The RSRQ is acquired according to the measured RSSI — S102 is no data in a data channel after a cell is closed, and increase the RSRQ measurement accuracy.

18 Claims, 1 Drawing Sheet

(51) Int. Cl.
*H04W 8/00* (2009.01)
*H04W 24/10* (2009.01)

(56) References Cited

U.S. PATENT DOCUMENTS

| | | |
|---|---|---|
| 2014/0086173 A1 | 3/2014 | Sadeghi et al. |
| 2015/0092582 A1* | 4/2015 | Liao ............... H04J 11/005 370/252 |
| 2015/0326356 A1* | 11/2015 | Guan ............... H04J 11/0093 370/330 |
| 2016/0218816 A1* | 7/2016 | Horiuchi ............... H04L 5/005 |
| 2016/0242061 A1* | 8/2016 | Harada ............... H04L 5/0098 |
| 2017/0201306 A1* | 7/2017 | Shimezawa ............... H04B 17/345 |

FOREIGN PATENT DOCUMENTS

| | | |
|---|---|---|
| CN | 103299708 A | 9/2013 |
| CN | 103428749 A | 12/2013 |
| JP | 2015-053667 A | 3/2015 |
| WO | 2013023364 A1 | 2/2013 |
| WO | 2013089421 A1 | 6/2013 |
| WO | 2015097998 A1 | 3/2017 |

OTHER PUBLICATIONS

ZTE, On DRS based RSRQ-like measurement, 3GPP TSG-RAN1#77 Seoul, Korea May 19-May 23, 2014, R1-142226.
Media Tek Inc., On discovery signal based RRM measurements, 3GPP TSG-RAN WG1 #77 Seoul, Korea, May 19-May 23, 2014, R1-142301.
Broadcom Corporation; RSRQ calculation for small cell On/Off, 3GPP TSG-RAN WG1 Meeting #77, Seoul, Korea, May 19-23, 2014, R1-142279.
Office Action dated Mar. 11, 2019 for Chinese Patent Application No. 201410214575.3 and English Translation.
Office Action dated Feb. 19, 2019 for European Patent Application No. 14892246.1-1214.

* cited by examiner

METHOD, DEVICE AND USER TERMINAL FOR MEASURING WITH DISCOVERY SIGNAL

TECHNICAL FIELD

The present document relates to the communication technology field, and in particular, to a method, apparatus and user terminal for measuring with a discovery signal.

BACKGROUND OF THE RELATED ART

The Small Cell technology adopts a low-power wireless access node, and can be used to extend the coverage of the Macro Cell, shunt the growing data traffic of the macro cell, and improve the use efficiency of the radio spectrum resources. The LTE-Advanced system uses this technology to improve the network capacity.

The Small Cell is usually relatively small in size, and the coverage is between 10 meters and 2 kilo meters. The Small Cell deployment scenarios of the LTE network can be composed of two layers, the macro cell and the small cell. The macro cell and the small cell can be deployed at the same frequency point, that is, co-channel deployment; and can also be deployed at the different frequency points, that is, non-co-channel deployment; and further, the macro cell may also be not deployed, while only the small cell is deployed. The small cell can be deployed in the indoor environment, and can also be deployed in the outdoor environment. It can be deployed sparsely, and can also be deployed densely.

The Small Cell is an interference limited system, and there is a complex interference relationship between a macro cell and a micro cell, and between micro cells. Each cell is dynamically scheduled for the terminal services within the cell respectively. In addition, with the movement of the User Equipment (UE), the UE would constantly move in or move out of the small cell, and the load and interference of the Small Cell system would show significant fluctuations. Therefore, it is necessary to adopt a certain interference coordination method to perform the interference suppression and coordination of the Small Cell, for example, an adaptive switching mechanism and an adaptive power adjustment mechanism of the small cell.

The basic idea of the adaptive switching mechanism of the small cell is to open and close some small cells with low load, so as to reduce the inter-cell interference. The open cell is called an active cell, and the closed cell is called a dormant cell. The active cell sends a data channel and a public channel normally; and the dormant cell closes a data channel and part of a public channel. However, both the active cell and the dormant cell can send a discovery signal (DS) of the cell, which is used for cell discovery and selection, activation/de-activation judgment, etc.

When a Reference Signal Receiving Quality (RSRQ) measurement is performed based on the discovery signal, the Received Signal Strength Indication (RSSI) measurement therein may have a measurement deviation because of the switching operation of the cell. A new RSRQ measurement method based on the discovery signal is provided here, which reduces the RSRQ measurement deviation based on the discovery signal.

SUMMARY

The present document aims to solve the technical problem of providing a method, apparatus and user terminal for measuring with a discovery signal, which is used to solve the problem that deviation of the RSRQ measurement based on the discovery signal is larger in the related art.

In order to solve the above technical problem, in one aspect, the present document provides a method for measuring with a discovery signal, including: when reference signal receiving quality (RSRQ) measurement is performed based on a discovery signal, performing a received signal strength indication (RSSI) measurement in a sub-frame where a discovery signal is located and/or a sub-frame without the discovery signal; and acquiring the RSRQ according to the measured RSSI.

Herein, the RSSI measurement is performed based on all orthogonal frequency division multiplexing (OFDM) symbols of the sub-frame where the discovery signal is located; or, the RSSI measurement is performed based on all OFDM symbols of the sub-frame without the discovery signal.

Herein, the RSSI measurement is performed based on all OFDM symbols of the sub-frame without the discovery signal and all OFDM symbols of the sub-frame where the discovery signal is located; or the RSSI measurement is performed based on all OFDM symbols of the sub-frame without the discovery signal and OFDM symbols without the discovery signal in the sub-frame where the discovery signal is located.

Herein, for the sub-frame where the discovery signal is located, the RSSI measurement is performed based on the OFDM symbols without the discovery signal in the sub-frame where the discovery signal is located; and for the sub-frame without the discovery signal, the RSSI measurement is performed based on OFDM symbols of which indexes are same as those of the OFDM symbols without the discovery signal in the sub-frame where the discovery signal is located.

Herein, the OFDM symbols without the discovery signal include at least one of the following: OFDM symbols without any component of the discovery signal, OFDM symbols without part of the components of the discovery signal.

Herein, for the sub-frame where the discovery signal is located, the RSSI measurement is performed based on OFDM symbols without the discovery signal which has been currently configured for sending and the discovery signal which is configured as a candidate for sending, in the sub-frame where the discovery signal is located; and for the sub-frame without the discovery signal, the RSSI measurement is performed based on the OFDM symbols without the discovery signal which is configured as a candidate for sending, in the sub-frame.

Herein, when the reference signal receiving quality (RSRQ) measurement is performed based on the discovery signal, the RSSI measurement is performed based on a cell reference signal (CRS) configured by a base station, and a reference signal receiving power (RSRP) measurement is performed based on the discovery signal; and the RSRQ is acquired according to the measured RSSI and RSRP.

Herein, the sub-frame where the discovery signal is located is acquired by an emission pattern and/or a measurement pattern of the discovery signal configured by the base station; and the sub-frame without the discovery signal is acquired by the emission pattern and/or the measurement pattern.

Herein, a location of the sub-frame without the discovery signal is acquired by adding an offset to an index of a sub-frame where the discovery signal is located which is adjacent to the sub-frame without the discovery signal.

Herein, the offset is a fixed value.

Herein, a RSSI measured value is a linear mean value of measured values of the OFDM symbols.

In another aspect, the present document further provides a device for measuring with a discovery signal, including: a received signal strength indication measuring unit, configured to: perform a received signal strength indication (RSSI) measurement in a sub-frame where a discovery signal is located and/or a sub-frame without the discovery signal, when reference signal receiving quality (RSRQ) measurement is performed based on the discovery signal; and a reference signal receiving quality acquiring unit, configured to acquire the RSRQ according to the measured RSSI.

Herein, the received signal strength indication measuring unit performs the RSSI measurement based on all orthogonal frequency division multiplexing (OFDM) symbols of the sub-frame where the discovery signal is located; or, the received signal strength indication measuring unit performs the RSSI measurement based on all OFDM symbols of the sub-frame without the discovery signal.

Herein, the received signal strength indication measuring unit performs the RSSI measurement based on all OFDM symbols of the sub-frame without the discovery signal and all OFDM symbols of the sub-frame where the discovery signal is located; or, the received signal strength indication measuring unit performs the RSSI measurement based on all OFDM symbols of the sub-frame without the discovery signal and OFDM symbols without the discovery signal in the sub-frame where the discovery signal is located.

Herein, for the sub-frame where the discovery signal is located, the received signal strength indication measuring unit performs the RSSI measurement based on OFDM symbols without the discovery signal in the sub-frame where the discovery signal is located; and for the sub-frame without the discovery signal, performs the RSSI measurement based on OFDM symbols of which indexes are same as those of the OFDM symbols without the discovery signal in the sub-frame where the discovery signal is located.

Herein, for the sub-frame where the discovery signal is located, the received signal strength indication measuring unit performs the RSSI measurement based on OFDM symbols without the discovery signal which has been currently configured for sending and the discovery signal which is configured as a candidate for sending in the sub-frame where the discovery signal is located; and for the sub-frame without the discovery signal, performs the RSSI measurement based on the OFDM symbols without the discovery signal which is configured as a candidate for sending in the sub-frame.

Herein, the received signal strength indication measuring unit acquires the sub-frame where the discovery signal is located by an emission pattern and/or a measurement pattern of the discovery signal configured by the base station; and acquires the sub-frame without the discovery signal by the emission pattern and/or the measurement pattern.

Herein, a location of the sub-frame without the discovery signal is acquired by adding an offset to an index of a sub-frame where the discovery signal is located which is adjacent to the sub-frame without the discovery signal; herein, a RSSI measured value is a linear mean value of measured values of the OFDM symbols.

In still another aspect, the present document further provides a user device, herein, the user device includes the above apparatus for measuring with the discovery signal.

The beneficial effects of the present document are as follows: with the present document, the RSSI measurement is performed based on a sub-frame where a discovery signal is located and/or a sub-frame without a discovery signal, which can reduce the measurement deviation caused by the situation that there is no data in a data channel after a cell is closed, and increase the RSRQ measurement accuracy.

SPECIFIC EMBODIMENTS

The present document is further illustrated in details in conjunction with the accompanying drawings and the embodiments below. It should be understood that the specific embodiments described herein are only used for explaining the present document and are not intended to limit the present document.

Figure 1:
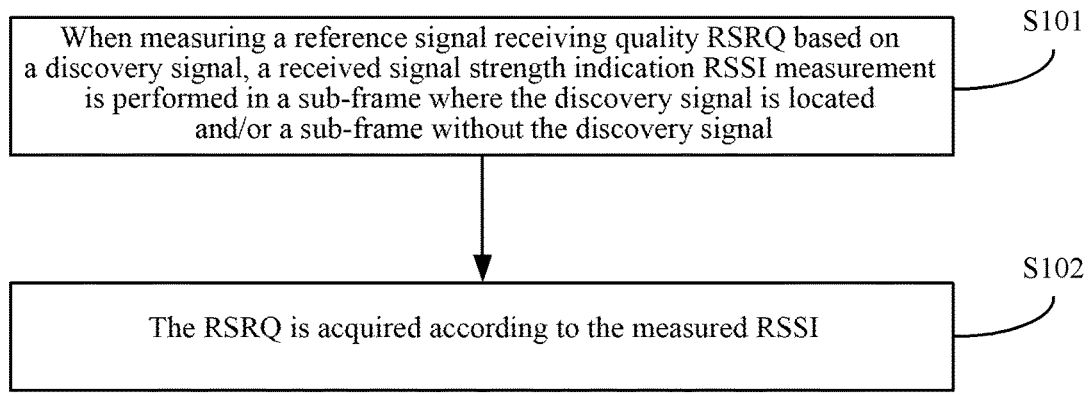
FIG. 1 is a flow chart of a method for measuring with a discovery signal in an embodiment of the present document.

As shown in FIG. 1, the embodiment of the present document involves a method for measuring with a discovery signal, including the following steps.

In step S101, when an RSRQ measurement is performed based on a discovery signal, an RSSI measurement is performed in a sub-frame where a discovery signal is located and/or a sub-frame without the discovery signal.

In the present step, the base station configures the terminal to perform the measurement based on one or more sub-frames, that is, to perform the measurement based on OFDM symbols of one sub-frame; or, to perform the measurement based on the OFDM symbols of multiple sub-frames, herein, the multiple sub-frames are sub-frames with a same type, that is, sub-frames with the discovery signal or sub-frames without the discovery signal; or, to perform the measurement based on the OFDM symbols of multiple sub-frames, herein, the multiple sub-frames are sub-frames including sub-frames of two types simultaneously, that is, sub-frames with the discovery signal and sub-frames without the discovery signal. Specific description is given below:

1. the RSSI measurement is performed based on all Orthogonal Frequency Division Multiplexing (OFDM) symbols of the sub-frame where the discovery signal is located. It can reduce the influence of the discovery signal and improve the accuracy rate to perform the RSSI measurement based on all OFDM symbols.

2. the RSSI measurement is performed based on all OFDM symbols of the sub-frame without the discovery signal. Performing the RSSI measurement on the OFDM symbols without the discovery signal can reduce the influence of the discovery signal and improve the accuracy rate.

3. the RSSI measurement is performed based on all OFDM symbols of the sub-frame without the discovery signal and all OFDM symbols of the sub-frame where the discovery signal is located. The RSSI measurement is performed by using two types of sub-frames simultaneously, which can have more measurement opportunities, and can be conducive to the implementation of the RSSI measurement, and also conducive to enhancing the accuracy of the RSSI measurement.

4. the RSSI measurement is performed based on all OFDM symbols of the sub-frame without the discovery signal and the OFDM symbols without the discovery signal in the sub-frame where the discovery signal is located. The RSSI measurement is performed by using two types of sub-frames simultaneously, which can have more measurement opportunities, and can be conducive to the implementation of the RSSI measurement, and also conducive to enhancing the accuracy of the RSSI measurement.

5. for the sub-frame where the discovery signal is located, the RSSI measurement is performed based on the OFDM symbols without the discovery signal in the sub-frame where the discovery signal is located; and for the sub-frame without the discovery signal, the RSSI measurement is performed based on the OFDM symbols of which indexes are same as those of the OFDM symbols without the discovery signal in the sub-frame where the discovery signal is located. For different types of sub-frames, the UE maintains the same measurement behavior to measure the same OFDM symbols; the RSSI measurement is performed by using two types of sub-frames simultaneously, which can have more measurement opportunities, and can be conducive to the implementation of the RSSI measurement, and also conducive to enhancing the accuracy of the RSSI measurement.

6. for the sub-frame where the discovery signal is located, the RSSI measurement is performed based on the OFDM symbols without the discovery signal which has been currently configured for sending and the discovery signal which is configured as a candidate for sending in the sub-frame where the discovery signal is located; and for the sub-frame without the discovery signal, the RSSI measurement is performed based on the OFDM symbols without the discovery signal which is configured as a candidate for sending in the sub-frame. For different types of sub-frames, the UE maintains the same measurement behavior to measure the same OFDM symbols; all the OFDM symbols possibly configured with DRS are uniformly excluded, and the complexity for the configuration is simplified; the RSSI measurement is performed by using two types of sub-frames simultaneously, which can have more measurement opportunities, and can be conducive to the implementation of the RSSI measurement, and also conducive to enhancing the accuracy of the RSSI measurement.

In the above six solutions, for the RSSI measurement performed by measuring multiple OFDM symbols, all measured symbols can be accumulated to calculate the average, and the RSSI measurement is performed by calculating the average.

In the above six solutions, the OFDM symbols without the discovery signal refer to:

a) OFDM symbols without any component of the discovery signal, or b) OFDM symbols without part of the components of the discovery signal.

Herein, the above b) may include: OFDM symbols except CSI-RS components in the discovery signal; or OFDM symbols except CRS components in the discovery signal; or OFDM symbols except a PSS/SSS component in the discovery signal; or OFDM symbols except combination of two of the above three types of components.

For the above PSS/SSS component, it may be or include the OFDM symbol where the PSS/SSS component is located, but the RB where the PSS/SSS component is located is not measured when the RSSI is measured.

The above method a) can simplify the implementation complexity; and the above method b) can provide more measurement resources, thus improving the measurement accuracy.

When the UE performs the RSSI measurement, it can be performed based on the indication of the base station, that is: the base station sends an indication instruction to the UE, which instructs the UE to perform the RSSI measurement based on which situation of the above six situations. The UE can also perform the RSSI measurement based on the pre-configuration, for example, which situation of the above six situations is adopted to perform the RSSI measurement under what circumstances, which is pre-configured in the UE. Or the default measurement situation is set; for example, the situation that the RSSI measurement is performed based on the sub-frame where the discovery signal is located or the sub-frame without the discovery signal is set as the default measurement situation; when the indication of the base station is not received, the RSSI measurement is performed under the default measurement situation.

The UE acquires a sub-frame where a discovery signal is located by an emission pattern and/or a measurement pattern of the discovery signal configured by the base station; and similarly, it can also acquire a sub-frame without the discovery signal by the above emission pattern and/or the measurement pattern.

On the premise that the sub-frame location of the discovery signal is known, a location of the sub-frame without the discovery signal can be acquired by adding an offset to an index of a sub-frame where the discovery signal is located which is adjacent to the sub-frame without the discovery signal; the offset is usually a fixed value, for example the offset is 1 or −1. The demand for signaling notification can be reduced by the above method.

In step S102, the RSRQ is acquired according to the measured RSSI.

The RSRQ is a ratio of the RSRP and the RSSI; of course, it may be adjusted by using a coefficient because the bandwidths on which both measurements are based may be different, that is, RSRQ=N*RSRP/RSSI. The RSSI is the average of powers of all the received signals (including the pilot signal and the data signal, the interference signal of the adjacent cell, the noise signal, etc.), which can be measured and acquired by the above steps. The Reference Signal Receiving Power (RSRP) is the average of powers of the received signals; and that value is a known value.

In the present step, when the base station indicates a terminal device to perform the reference signal receiving quality (RSRQ) measurement based on the discovery signal, the terminal device performs the RSSI measurement based on a cell reference signal (CRS) configured by the base station, and a reference signal receiving power (RSRP) measurement is performed based on the discovery signal at the same time; and the RSRQ is acquired according to the measured RSSI and RSRP.

Figure 2:
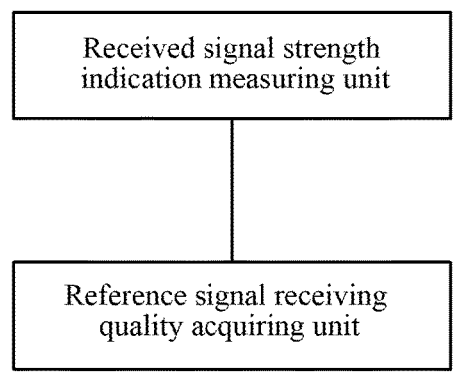
FIG. 2 is a structural schematic diagram of an apparatus for measuring with a discovery signal in an embodiment of the present document.

As shown in FIG. 2, the embodiment of the present document involves an apparatus for measuring with a discovery signal, including the following units:

a received signal strength indication measuring unit, configured to perform a received signal strength indication (RSSI) measurement in a sub-frame where a discovery signal is located and/or a sub-frame without the discovery signal when the reference signal receiving quality (RSRQ) measurement is performed based on the discovery signal; and a reference signal receiving quality acquiring unit, configured to acquire the RSRQ according to the measured RSSI.

The received signal strength indication measuring unit performs the RSSI measurement based on all orthogonal frequency division multiplexing (OFDM) symbols of the sub-frame where the discovery signal is located; or the received signal strength indication measuring unit performs the RSSI measurement based on all OFDM symbols of the sub-frame without the discovery signal.

The received signal strength indication measuring unit performs the RSSI measurement based on all OFDM symbols of the sub-frame without the discovery signal and all OFDM symbols of the sub-frame where the discovery signal is located; or the received signal strength indication measuring unit performs the RSSI measurement based on all OFDM symbols of the sub-frame without the discovery signal and the OFDM symbols without the discovery signal in the sub-frame where the discovery signal is located.

For the sub-frame where the discovery signal is located, the received signal strength indication measuring unit performs the RSSI measurement based on the OFDM symbols without the discovery signal in the sub-frame where the discovery signal is located; and for the sub-frame without the discovery signal, performs the RSSI measurement based on OFDM symbols of which indexes are same as those of the OFDM symbols without the discovery signal in the sub-frame where the discovery signal is located.

The received signal strength indication measuring unit acquires a sub-frame where the discovery signal is located by an emission pattern and/or a measurement pattern of the discovery signal configured by the base station; and acquires a sub-frame without the discovery signal by the emission pattern and/or the measurement pattern.

Herein, a location of the sub-frame without the discovery signal is acquired by adding an offset to an index of a sub-frame where the discovery signal is located which is adjacent to the sub-frame without the discovery signal. The offset is usually a fixed value, for example the offset is 1 or −1.

The embodiment of the present document further relates to a user equipment (UE), herein, the user device measures the RSSI and/or the RSRQ by adopting the apparatus for measuring with the discovery signal to which the above embodiments relate. Since the apparatus for measuring with the discovery signal in the above embodiments has been described in detail, the apparatus will not be described in the present embodiment.

Several specific embodiments are given for illustration hereinafter.

1. The RSSI measurement is performed based on all OFDM symbols of the sub-frame where the discovery signal is located; it can reduce the influence of the discovery signal and improve the accuracy rate to perform the RSSI measurement based on all OFDM symbols.

The base station configures the emission pattern and/or the measurement pattern of the discovery signal for the UE, and notifies the UE to perform the RSRQ measurement. The base station may further indicate the UE to perform or the UE performs, according to the pre-configuration, the RSSI measurement based on all OFDM symbols of the sub-frame where the discovery signal is located. A preferred measured value is a linear mean value of all the above OFDM measured values. At the same time, the UE performs the RSRP measurement based on the discovery signal and/or a Cell Reference Signal (CRS), and finally calculates and acquires the RSRQ based on the measured RSRP and RSSI. Since the RSSI measurement is performed based on the OFDM symbols of all the sub-frames, the resources occupied by the discovery signal only occupy a part of the resources, thus, it can reduce the influence of the discovery signal and improve the measurement accuracy compared to the OFDM symbols occupied by using the discovery signal individually.

2. The RSSI measurement is performed based on all OFDM symbols of the sub-frame without the discovery signal; performing the RSSI measurement on the OFDM symbols without the discovery signal can reduce the influence of the discovery signal and improve the accuracy rate.

The base station configures the UE to perform the RSSI measurement based on all OFDM symbols of the sub-frame without the discovery signal. The way of configuring these measured sub-frames includes:

way one: those can be acquired based on the emission pattern and/or the measurement pattern of the discovery signal that are configured to the UE by the base station, that is, the UE selects to perform the measurement in sub-frames except one including the discovery signal;

way two: the base station directly configures the pattern of the sub-frame measured by the UE, which can be an index number directly indicating the sub-frame or a relative offset with respect to an index number of the emission pattern and/or the measurement pattern of the discovery signal.

The UE performs the RSSI measurement based on all the configured OFDM symbols of the sub-frame without the discovery signal. A preferred measured value is a linear mean value of all the OFDM measured values. At the same time, the UE performs the RSRP measurement based on the discovery signal and/or the CRS, and finally the RSRQ is calculated based on the measured RSRP and RSSI. Since the RSSI measurement is performed based on the OFDM symbols without the discovery signal, it does not include the OFDM symbols used by the discovery signal, thus it can reduce the influence of the discovery signal and improve the measurement accuracy compared to the OFDM symbols occupied by using the discovery signal individually.

3. The RSSI measurement is performed based on all OFDM symbols of the sub-frame without the discovery signal and all OFDM symbols of the sub-frame where the discovery signal is located; the RSSI measurement is performed by using two types of sub-frames simultaneously, which can have more measurement opportunities, and can be conducive to the implementation of the RSSI measurement, and also conducive to enhancing the accuracy of the RSSI measurement.

The base station configures the UE to perform the RSSI measurement based on all OFDM symbols of the sub-frame without the discovery signal and all OFDM symbols of the sub-frame where the discovery signal is located. A preferred measured value is a linear mean value of all the OFDM measured values. At the same time, the UE performs the RSRP measurement based on the discovery signal and/or the CRS; finally the RSRQ is calculated based on the measured RSRP and RSSI. The RSSI measurement is performed by using two types of sub-frames simultaneously, which can have more measurement opportunities, and can be conducive to the implementation of the RSSI measurement, and also conducive to enhancing the accuracy of the RSSI measurement.

4. The RSSI measurement is performed based on all OFDM symbols of the sub-frame without the discovery signal and the OFDM symbols without the discovery signal in the sub-frame where the discovery signal is located. The RSSI measurement is performed by using two types of sub-frames simultaneously, which can have more measurement opportunities, and can be conducive to the implementation of the RSSI measurement, and also conducive to enhancing the accuracy of the RSSI measurement.

The base station configures the UE to perform the RSSI measurement based on all OFDM symbols of the sub-frame without the discovery signal and the OFDM symbols without the discovery signal in the sub-frame where the discovery signal is located. A preferred measured value is a linear mean value of the OFDM measured values. At the same time, the UE performs the RSRP measurement based on the discovery signal and/or the CRS, and finally the RSRQ is calculated based on the measured RSRP and RSSI. The RSSI measurement is performed by using two types of sub-frames simultaneously, which can have more measurement opportunities, and can be conducive to the implementation of the RSSI measurement, and also conducive to further enhancing the accuracy of the RSSI measurement because the OFDM symbol where the discovery signal is located is not used.

5. For the sub-frame where the discovery signal is located, the RSSI measurement is performed based on the OFDM symbols without the discovery signal in the sub-frame where the discovery signal is located; and for the sub-frame without the discovery signal, the RSSI measurement is performed based on OFDM symbols of which indexes are same as those of the OFDM symbols without the discovery signal in the sub-frame where the discovery signal is located. For example, the number of the OFDM symbols of one sub-frame is 14, and the locations of the OFDM symbols occupied by the discovery signal are 11 and 12. Then the RSSI measurement is performed based on the OFDM symbols except the two OFDM symbols, 11 and 12, for the sub-frame where the discovery signal is located; and similarly the RSSI measurement is performed based on the OFDM symbols except the two OFDM symbols, 11 and 12, for the sub-frame without the discovery signal. A preferred measured value is a linear mean value of the OFDM measured values. At the same time, the UE performs the RSRP measurement based on the discovery signal and/or the CRS, and finally the RSRQ is calculated based on the measured RSRP and RSSI.

For different types of sub-frames, the UE maintains the same measurement behavior to measure the same OFDM symbols. The RSSI measurement is performed by using two types of sub-frames simultaneously, which can have more measurement opportunities, and can be conducive to the implementation of the RSSI measurement, and also conducive to enhancing the accuracy of the RSSI measurement.

6. For the sub-frame where the discovery signal is located, the RSSI measurement is performed based on OFDM symbols without the discovery signal which has been currently configured for sending and the discovery signal which is possibly configured for sending in the sub-frame where the discovery signal is located; for the sub-frame without the discovery signal, the RSSI measurement is performed based on the OFDM symbols without the discovery signal which is possibly configured for sending in the sub-frame. For example, assuming that the discovery signal may be selected to be configured for sending at the 10th, 11th and 12th OFDM symbols of one sub-frame. If only the 10th OFDM symbol of one sub-frame is actually configured for sending before, the RSSI measurement is performed by only using the OFDM symbols except the 10th, 11th and 12th OFDM symbols of the sub-frame; for the sub-frame for which the discovery signal is currently not configured for sending, the RSSI measurement is also performed by only using the OFDM symbols except the 10th, 11th and 12th OFDM symbols of the sub-frame.

For different types of sub-frames, the UE maintains the same measurement behavior to measure the same OFDM symbols; all the OFDM symbols possibly configured with DRS are uniformly excluded, and the complexity for the configuration is simplified; the RSSI measurement is performed by using two types of sub-frames simultaneously, which can have more measurement opportunities, and can be conducive to the implementation of the RSSI measurement, and also conducive to enhancing the accuracy of the RSSI measurement.

7. When the reference signal receiving quality (RSRQ) measurement is performed based on the discovery signal, the received signal strength indication (RSSI) measurement is performed based on the RSSI method based on the CRS configured by the base station, and at the same time a reference signal receiving power (RSRP) measurement is performed based on the discovery signal. The RSRQ is acquired according to the measured RSSI and RSRP.

Specifically, the base station configures the UE to perform the RSSI measurement based on the OFDM symbol where the CRS is located or configures the UE to perform the measurement based on all the OFDM symbols of the sub-frame on which the CRS is sent. At the same time, the base station configures the UE to perform the RSRP measurement based on the discovery signal. The RSRQ is acquired according to the measured RSSI and RSRP.

The method preferably uses a scenario that the cell is in an open state and the measured sub-frame is a CRS sending sub-frame. The base station may configure the UE to perform the RSRQ measurement based on the CRS at the same time, therefore, the RSSI value was obtained already for the corresponding RSRQ measurement, thus the RSRQ value based on the discovery signal can be calculated based on the RSSI value and further the RSRP acquired based on the discovery signal, which can reduce the calculation amount of the measurement.

In the above method, the base station may further configure the terminal to perform the measurement based on one or more sub-frames. The method includes:

performing the measurement based on OFDM symbols of one sub-frame. A preferred measured value is a linear mean value of the OFDM measured values of the sub-frames; or performing the measurement based on multiple OFDM symbols including the sub-frames, herein, the multiple sub-frames are sub-frames with a same type, that is, sub-frames including the discovery signal or sub-frames without the discovery signal. A preferred measured value is a linear mean value of the OFDM symbols of the multiple sub-frames; or performing the measurement based on multiple OFDM symbols including the sub-frames, herein, the multiple sub-frames are sub-frames that include two types of sub-frames simultaneously, that is, sub-frames including the discovery signal and sub-frames without the discovery signal. A preferred measured value is a linear mean value of the OFDM symbols of the multiple sub-frames.

In the above method, the base station may further indicate the UE to perform the RSRP measurement based on the CRS and/or the discovery signal, or to perform the RSRP measurement by using the discovery signal and/or the CRS as prearranged. The RSRP measurement is performed preferably by using the discovery signal by default; if the base station specifically instructs to use the CRS, then the UE uses the CRS to perform the RSRP measurement.

With the embodiment of the present document, the RSSI measurement is performed based on the sub-frame where a discovery signal is located and/or a sub-frame without the discovery signal, which can reduce the measurement deviation, caused by the situation that there is no data in a data channel after a cell is closed, and increase the RSRQ measurement accuracy.

Although the preferred embodiments of the present document have been disclosed for the purpose of illustration, the skilled in the art may realize that various improvements, additions and substitutions are possible, hence the scope of the present document should not be limited to the above embodiments.

INDUSTRIAL APPLICABILITY

As described above, with the above embodiments and the preferred implementations, the RSSI measurement is performed based on the sub-frame where a discovery signal is located and/or a sub-frame without the discovery signal, which can reduce the measurement deviation caused by the situation that there is no data in a data channel after a cell is closed, and increase the RSRQ measurement accuracy.

What we claim is:

1. A method for measuring with a discovery signal, comprising:
    performing a received signal strength indication RSSI measurement in a sub-frame where a discovery signal is located and/or a sub-frame without a discovery signal when a reference signal receiving quality RSRQ measurement is performed based on the discovery signal; and acquiring the RSRQ according to the measured RSSI;
    wherein the sub-frame where the discovery signal is located is acquired by a measurement pattern of the discovery signal configured by the base station;
    wherein
    when the reference signal receiving quality RSRQ measurement is performed based on the discovery signal, the RSSI measurement is performed based on a RSSI method based on a cell reference signal CRS configured by a base station, and a reference signal receiving power RSRP measurement is performed based on the discovery signal; and the RSRQ is acquired according to the measured RSSI and RSRP.

2. The method for measuring with a discovery signal according to claim 1, wherein the RSSI measurement is performed based on all orthogonal frequency division multiplexing OFDM symbols of the sub-frame where the discovery signal is located.

3. The method for measuring with a discovery signal according to claim 1, wherein the RSSI measurement is performed based on all OFDM symbols of the sub-frame without the discovery signal and all OFDM symbols of the sub-frame where the discovery signal is located.

4. The method for measuring with a discovery signal according to claim 1, wherein
    for the sub-frame where the discovery signal is located, the RSSI measurement is performed based on the OFDM symbols without the discovery signal in the sub-frame where the discovery signal is located; and
    for the sub-frame without the discovery signal, the RSSI measurement is performed based on OFDM symbols of which indexes are same as those of the OFDM symbols without the discovery signal in the sub-frame where the discovery signal is located.

5. The method for measuring with a discovery signal according to claim 3, wherein the OFDM symbols without the discovery signal comprise OFDM symbols without part of components of the discovery signal.

6. The method for measuring with a discovery signal according to claim 1, wherein
    for the sub-frame where the discovery signal is located, the RSSI measurement is performed based on the OFDM symbols without the discovery signal which has been currently configured for sending and the discovery signal which is configured as a candidate for sending in the sub-frame where the discovery signal is located; and
    for the sub-frame without the discovery signal, the RSSI measurement is performed based on the OFDM symbols without the discovery signal which is configured as a candidate for sending in the sub-frame.

7. The method for measuring with a discovery signal according to claim 1, wherein the sub-frame without the discovery signal is acquired by the emission pattern and/or the measurement pattern.

8. The method for measuring with a discovery signal according to claim 1, wherein
    a location of the sub-frame without the discovery signal is acquired by adding an offset to an index of a sub-frame where the discovery signal is located which is adjacent to the sub-frame without the discovery signal.

9. The method for measuring with a discovery signal according to claim 1, wherein a RSSI measured value is a linear mean value of measured values of the OFDM symbols.

10. An apparatus for measuring with a discovery signal, comprising a processor and a storage device, wherein the storage device stores processor-executable programs, and the programs comprise: a received signal strength indication measuring unit, and a reference signal receiving quality acquiring unit:
    the received signal strength indication measuring unit, configured to perform a received signal strength indication RSSI measurement in a sub-frame where a discovery signal is located and/or a sub-frame without a discovery signal when a reference signal receiving quality RSRQ measurement is performed based on the discovery signal; and
    the reference signal receiving quality acquiring unit, configured to acquire the RSRQ according to the measured RSSI;
    wherein the received signal strength indication measuring unit acquires the sub-frame where the discovery signal is located by a measurement pattern of the discovery signal configured by the base station;
    wherein
    when the reference signal receiving quality RSRQ measurement is performed based on the discovery signal, the RSSI measurement is performed based on a RSSI method based on a cell reference signal CRS configured by a base station, and a reference signal receiving power RSRP measurement is performed based on the discovery signal; and the RSRQ is acquired according to the measured RSSI and RSRP.

11. The apparatus for measuring with a discovery signal according to claim 10, wherein the received signal strength indication measuring unit performs the RSSI measurement based on all orthogonal frequency division multiplexing OFDM symbols of the sub-frame where the discovery signal is located.

12. The apparatus for measuring with a discovery signal according to claim 10, wherein the received signal strength indication measuring unit performs the RSSI measurement based on all OFDM symbols of the sub-frame without the discovery signal and all OFDM symbols of the sub-frame where the discovery signal is located.

13. The apparatus for measuring with a discovery signal according to claim 10, wherein the received signal strength indication measuring unit performs the RSSI measurement based on the OFDM symbols without the discovery signal in the sub-frame where the discovery signal is located for the sub-frame where the discovery signal is located; and performs the RSSI measurement based on OFDM symbols of which indexes are same as those of the OFDM symbols without the discovery signal in the sub-frame where the discovery signal is located for the sub-frame without discovery signal.

14. The apparatus for measuring with a discovery signal according to claim 10, wherein the received signal strength indication measuring unit performs the RSSI measurement based on the OFDM symbols without the discovery signal which has been currently configured for sending and the discovery signal which is configured as a candidate for sending in the sub-frame where the discovery signal is located for the sub-frame where the discovery signal is located; and performs the RSSI measurement based on the OFDM symbols without the discovery signal which is configured as a candidate for sending in the sub-frame for the sub-frame without the discovery signal.

15. The apparatus for measuring with a discovery signal according to claim 10, wherein the received signal strength indication measuring unit acquires the sub-frame without the discovery signal by the emission pattern and/or the measurement pattern; and a location of the sub-frame without the discovery signal is acquired by adding an offset to an index of a sub-frame where the discovery signal is located which is adjacent to the sub-frame without the discovery signal; wherein a RSSI measured value is a linear mean value of measured values of the OFDM symbols.

16. A user device, comprising an apparatus for measuring with a discovery signal according to claim 10.

17. The method for measuring with a discovery signal according to claim 4, wherein the OFDM symbols without the discovery signal comprise OFDM symbols without part of components of the discovery signal.

18. The method for measuring with a discovery signal according to claim 1, wherein the RSSI measurement is performed based on all OFDM symbols of the sub-frame without the discovery signal.

* * * * *